Jan. 2, 1940.                L. J. HILL                2,185,553
                              FASTENER
                         Filed April 12, 1939
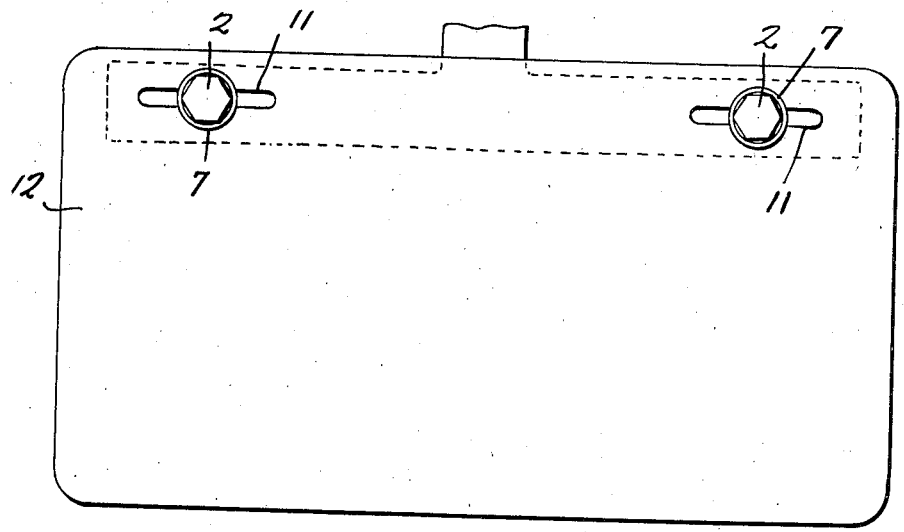
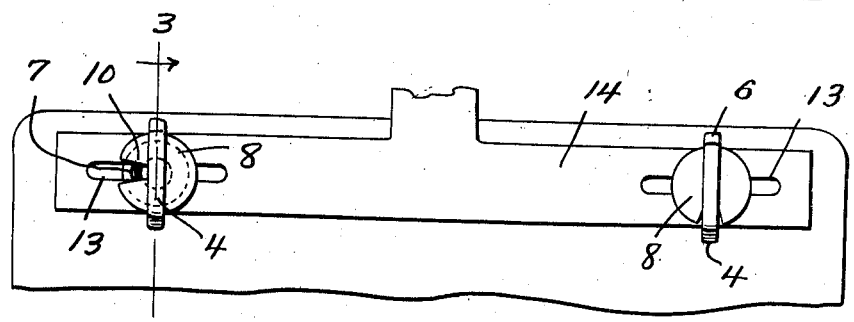
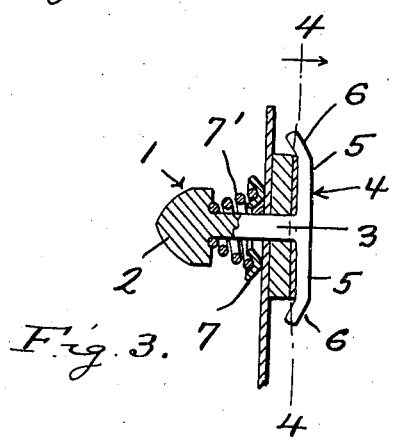
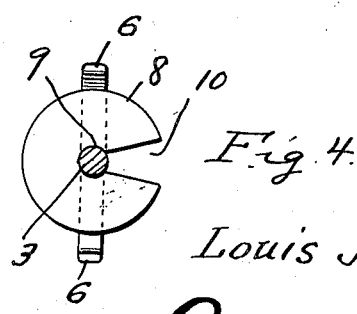
Inventor
Louis J. Hill
By Clarence A. O'Brien
and Hyman Berman
Attorneys Patented Jan. 2, 1940

2,185,553

UNITED STATES PATENT OFFICE 2,185,553

FASTENER

Louis J. Hill, Madison, Ind.

Application April 12, 1939, Serial No. 267,503

1 Claim. (Cl. 40—125)

My invention relates to improvements in fasteners for use more particularly in securing automobile license plates to the plate hanger or bracket of usual standard form.

The invention is designed with the particular purpose in view of providing a simply constructed, inexpensive and easily applied fastener assembly which cannot work loose and parts thereof thereby become lost and which will not freeze to the plate or bracket through rust and thereby become unfitted for repeated use.

To the accomplishment of the above and subordinate objects presently appearing, a preferred embodiment of my invention has been illustrated in the accompanying drawing, set forth in detail in the succeeding description, and defined in the claim appended hereto.

In said drawing:

Figure 1 is a view in front elevation illustrating the fastener of my invention applied.

Figure 2 is a fragmentary view in rear elevation.

Figure 3 is a view in vertical transverse section taken on the line 3—3 of Figure 2, looking in the direction indicated by the arrows, and drawn to an enlarged scale, and Figure 4 is a view in vertical section taken on the line 4—4 of Figure 3 looking in the direction indicated by the arrows.

Referring to the drawing by numerals, the fastener assembly of my invention comprises, as its basic element, a bolt 1 having a head 2 of hexagonal or other suitable form, a preferably round shank 3, and a T-shaped tail end 4 comprising straight branches 5 terminating in ends 6 inclining slightly toward the head 2. A cupped washer, of any suitable material, 7 is sleeved onto the shank 3 with a coil spring 7' interposed on said shank between the same and the head 2. A disc-like locking member 8 of thin resilient metal is provided for attachment to the shank 3 with a snap action, said member, for this purpose, having an axial aperture 9 therein of the proper diameter to fit snugly around the shank 3 and a radial throat, or slot, 10 converging toward the aperture 9 for sliding the member 8 into position on the shank 3, said throat at its innermost, or narrowest, end being slightly smaller than the aperture 9 so that said member may be snapped onto said shank. As best shown in Figure 3 the member 8 is of the proper size to fit against the T head 4 flat and between the ends 6 of said head.

In applying the described fastener, the locking member 8 is first detached by any suitable implement such as pliers, and the bolt 1 inserted T head 4 foremost through the usual slot 11 in the license plate 12 and then through the similar slot 13 provided in the usual plate supporting bracket 14 until the T head 4 is located behind said bracket. In this operation, as will be understood, the T head 4 is turned to align the same with said slots 11 and 13 and the bolt is tensioned against such insertion by the engagement of the washer 7 with the front side of the plate 12 and opposition of the spring 7'. The bolt 1 is next turned to position the T head 4 crosswise of the bracket 14 in which position of said head the ends 6 thereof incline over the upper and lower edges of the bracket 14 as shown in Figure 3. The locking member 8 is next attached to the shank 3 in the manner already described between the T head 4 and the rear side of the bracket 14, the bolt 1 being shoved inwardly against the tension of the spring 7' during this operation. Upon release of the bolt 1 it springs forwardly under the action of the spring 7' and thereby clamps the locking member 8 between said head 4 and the bracket 14, the washer 7 and spring 7' clamping the plate 12 to the front of said bracket.

The described parts of the fastener are formed of any suitable rustproof material. The manner in which the fastener may be detached will be manifest.

The foregoing will, it is believed, suffice to impart a clear understanding of my invention without further explanation.

Manifestly the invention, as described, is susceptible of modification without departing from the inventive concept and right is herein reserved to such modifications as fall within the scope of the subjoined claim.

What I claim is:

A fastener for securing an automobile license plate to the front of a plate supporting bar, said plate and bar having longitudinally extending mating slots therein, said fastener comprising a bolt having a head and a T-shaped tail end adapted for insertion rearwardly through said slots and turning behind said bar into crosswise position relative thereto, said tail end having angular terminals adapted to overlie the edges of said bar in said crosswise position of said end to interlock with said edges and prevent turning of said bolt, spring means on said bolt adapted to be interposed between the head thereof and said plate to urge said bolt forwardly and thereby urge said head toward said bar, and a locking member attached to said bolt with a snap action adjacent said tail to block withdrawal of said bolt from said slots, said member comprising a radially split disc of resilient material.

LOUIS J. HILL.